(12) United States Patent
Hoenes et al.

(10) Patent No.: US 9,541,644 B2
(45) Date of Patent: Jan. 10, 2017

(54) DEVICE FOR MONITORING A DISTANCE BETWEEN A VEHICLE AND AN OBJECT

(75) Inventors: Frank Hoenes, Ditzingen (DE); Frank Seidel, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 979 days.

(21) Appl. No.: 13/516,154

(22) PCT Filed: Nov. 24, 2010

(86) PCT No.: PCT/EP2010/068108
§ 371 (c)(1),
(2), (4) Date: Aug. 24, 2012

(87) PCT Pub. No.: WO2011/073001
PCT Pub. Date: Jun. 23, 2011

(65) Prior Publication Data
US 2012/0320208 A1 Dec. 20, 2012

(30) Foreign Application Priority Data
Dec. 15, 2009 (DE) .................. 10 2009 054 634

(51) Int. Cl.
*G01S 15/93* (2006.01)
*G01S 15/00* (2006.01)
(Continued)

(52) U.S. Cl.
CPC ............ *G01S 15/931* (2013.01); *G01S 15/003* (2013.01); *G01S 15/46* (2013.01); *G01S 15/87* (2013.01);
(Continued)

(58) Field of Classification Search
CPC ...... G01S 15/931; G01S 15/003; G01S 15/46; G01S 15/87
(Continued)

(56) References Cited

U.S. PATENT DOCUMENTS

| 2005/0195071 A1* | 9/2005 | Ewerhart et al. ............. 340/435 |
| 2010/0256909 A1* | 10/2010 | Duggan et al. ............... 701/301 |

FOREIGN PATENT DOCUMENTS

| CN | 100999215 | 7/2007 |
| DE | 198 56 974 | 9/2000 |
| DE | 10 2004 020423 | 11/2005 |

* cited by examiner

*Primary Examiner* — Basil T Jos
(74) *Attorney, Agent, or Firm* — Norton Rose Fulbright US LLP; Gerard Messina

(57) ABSTRACT

A device for monitoring a distance between a vehicle and object, including distance sensors mounted in the front and/or rear vehicle region(s), an electronic unit connected thereto, and a display device for visually and/or acoustically displaying distances. The electronic unit generating a full warning signal even prior to reaching the predefined minimum limiting value for an ascertained distance at an established first warning distance value which is greater than the minimum limiting value of a first sensor, if a distance, which is smaller than a first limiting value, is ascertained by a direct echo of the first sensor, the first limiting value being greater than the minimum limiting value of the first sensor, and if a distance, which is greater than a second limiting value, is ascertained by a direct echo of the second sensor, the second limiting value being greater than the minimum limiting value of the second sensor.

10 Claims, 4 Drawing Sheets

(51) Int. Cl.
*G01S 15/46* (2006.01)
*G01S 15/87* (2006.01)
*G01S 13/93* (2006.01)

(52) U.S. Cl.
CPC ...... *G01S 15/878* (2013.01); *G01S 2013/9375* (2013.01); *G01S 2013/9378* (2013.01); *G01S 2013/9389* (2013.01)

(58) Field of Classification Search
USPC .......................................................... 701/301
See application file for complete search history.

DEVICE FOR MONITORING A DISTANCE BETWEEN A VEHICLE AND AN OBJECT

FIELD OF THE INVENTION

The present invention relates to a device for monitoring a distance between a vehicle and an object.

BACKGROUND INFORMATION

Devices for monitoring a distance between a vehicle and an object are known from a multitude of different specific embodiments.

One specific embodiment of a monitoring device includes determining a distance between a vehicle and an object based on ultrasound sensors. For a measurement, multiple measuring sensors for transmitting and receiving transmitting pulses may be positioned in the front and/or the rear region(s) of a vehicle. Using the received pulses, an electronic unit calculates a distance to the closest obstacle and generates a full warning signal, e.g., a continuous tone, if this distance is smaller than a predefined minimum limiting value.

Sensors transmit and receive signals within a so-called measuring cone, whereby a monitored region at the vehicle is defined by the configuration of the sensors in the vehicle contour of the front and the rear regions, as well as the side zones of a vehicle.

SUMMARY OF THE INVENTION

An object to be achieved by the exemplary embodiments and/or exemplary methods of the present invention is considered to provide a device for monitoring a distance between an object and a vehicle which allows an improved monitoring of a rear and/or a front region.

The object may be achieved by the features of the system and/or method as described herein. Advantageous expansions of the exemplary embodiments and/or exemplary methods of the present invention are also described herein.

The exemplary embodiments and/or exemplary methods of the present invention are directed to a device for monitoring a distance between a vehicle and an object, including multiple distance sensors to be mounted in the front and/or in the rear region(s) of the vehicle, a first distance sensor being provided to be positioned in the region of a vehicle corner and a second distance sensor to be positioned spaced apart from the first sensor in the direction of the center of the vehicle for monitoring a distance region surrounding the vehicle corner, and an electronic unit which is connected to the distance sensors, which generates a full warning signal upon reaching a predefined minimum limiting value of a distance ascertained using the distance sensors, and which activates a display device for visually and/or acoustically displaying distances.

Sensors which perform a distance measurement have a minimum measuring distance which results from the post-pulse oscillation of the diaphragm system. The minimum limiting value of a minimum measuring distance of a sensor lies, for example, in the range of approximately 20 cm, depending on the technical design of the sensor. Distance values which are smaller than a minimum limiting value of a sensor "blend" with the post-pulse oscillation of the diaphragm system and can no longer be precisely resolved. Identical distance values around a sensor define in space a section of a spherical surface. Measuring signals which are transmitted by an ultrasound sensor and are received by the same sensor are known as direct echo. The measuring signals which are transmitted by an ultrasound sensor and are received by a directly adjoining sensor are known as cross echo. Identical distance values for a cross echo define in space the surface of an ellipsoid.

An aspect of the exemplary embodiments and/or exemplary methods of the present invention is that the electronic unit is configured to generate a full warning signal even prior to reaching the predefined minimum limiting value for an ascertained distance at an established first warning distance value which is greater than a minimum limiting value of a sensor, if a distance, which is smaller than a first limiting value, is ascertained by a direct echo of the first sensor, the first limiting value being greater than a minimum limiting value of the first sensor, and if a distance, which is greater than a second limiting value, is ascertained by a direct echo of the second sensor, the second limiting value being greater than a minimum limiting value of the second sensor.

Due to structural and design requirements, sensors cannot be positioned in any desired position in the bumper. If a distance to the vehicle corner which is greater than the minimum limiting value of the sensor results when positioning an external sensor, no full warning, e.g., a continuous tone, is generated for obstacle objects in the region of the vehicle corner, which is outside the minimum limiting value. Therefore, the driver of the vehicle is not made aware of a collision risk. The risk of damage to the vehicle in such a region of the vehicle corner by an obstacle object, e.g., a pole, is very high. By defining the limiting values, which are greater than the minimum limiting value, an offset of a minimum limiting value into a special region of the vehicle may be achieved for the driver of a vehicle, to prevent a collision of the vehicle with an obstacle object in the neuralgic areas.

In another embodiment of the present invention, it is provided that the first and the second limiting values are selected in such a way that both the first limiting value and the second limiting value have the same value at least at one point in a range of a central measuring axis before the first sensor. In this way, the range defined by the limiting values may be put into a region which lies in front of a corner region to be monitored.

In another aspect of the exemplary embodiments and/or exemplary methods of the present invention, it is provided that the electronic unit is configured to generate a full warning signal even prior to reaching the predefined minimum limiting value for an ascertained distance at an established warning distance value, if a distance, which is smaller than a first limiting value, is ascertained by a direct echo of the first sensor, the first limiting value being greater than the minimum limiting value, and if a distance is ascertained, which is greater than a third limiting value, by a cross echo of the first and the second sensors. The definition of a limiting value together with the conditions may be used for a special offset to offset the warning distance value from a predefined value to a new value at which a full warning signal is generated.

In another embodiment of the present invention, it is provided that the first and the third limiting values are selected in such a way that between a range before the minimum limiting value of the first sensor and the second limiting value both the first and the third limiting values have an identical value at least at one point. In this way, the range between the limiting values, which defines a consideration of the offset, is advantageously put into the corner region of the vehicle.

In another aspect of the exemplary embodiments and/or exemplary methods of the present invention, it is provided that the electronic unit is configured to output a full warning signal even prior to reaching the predefined minimum limiting value for an ascertained distance only at a second warning distance value, which is greater than the first warning distance value by an offset, if a distance, which is smaller than a fourth limiting value, is additionally ascertained by a direct echo of the first sensor, and a distance, which is greater than a fifth limiting value, is ascertained by a cross echo of the first and the second sensors, the fourth limiting value being smaller than the first limiting value, and the fifth limiting value being greater than the minimum limiting value of the first sensor. When detecting an obstacle object in the distance ranges between the first and the third limiting values, the minimum limiting value is corrected using a first offset value. When an object enters the second monitored region between the fourth and the fifth limiting values, another offset correction is carried out. If the distance value, which was corrected using the offset values, lies within the second monitored region, a full warning as well as all precursors to the full warning may be signaled to the driver. This two-stage method is suitable for positioning distance sensors on vehicles having relatively large vehicle contours.

In another embodiment of the present invention, it is provided that the fourth and the fifth limiting values are selected in such a way that in a range between the first and the third limiting values before the first sensor both the fourth and the fifth limiting values have an identical value at one point.

In another embodiment of the present invention, it is provided that the first offset value is set to a value which is smaller than a hysteresis value for taking back a generated full warning signal.

In another embodiment of the present invention, it is provided that the second offset value is set to a value which is smaller than the first offset value plus a hysteresis value.

Setting a hysteresis value ensures that a display is continuously updated if an obstacle object approaches a vehicle and it prevents a so-called "jumping" of the display or the output medium for the driver, if the obstacle object moves away from the vehicle.

In another embodiment of the present invention, it is provided that the first limiting value is greater than the minimum limiting value plus the first offset value. In another embodiment of the present invention, it is provided that the second offset value is smaller than the fourth limiting value which is smaller than the first limiting value.

Additional features of the exemplary embodiments and/or exemplary methods of the present invention are derived from the following description of the figures.

DETAILED DESCRIPTION

Figure 1:
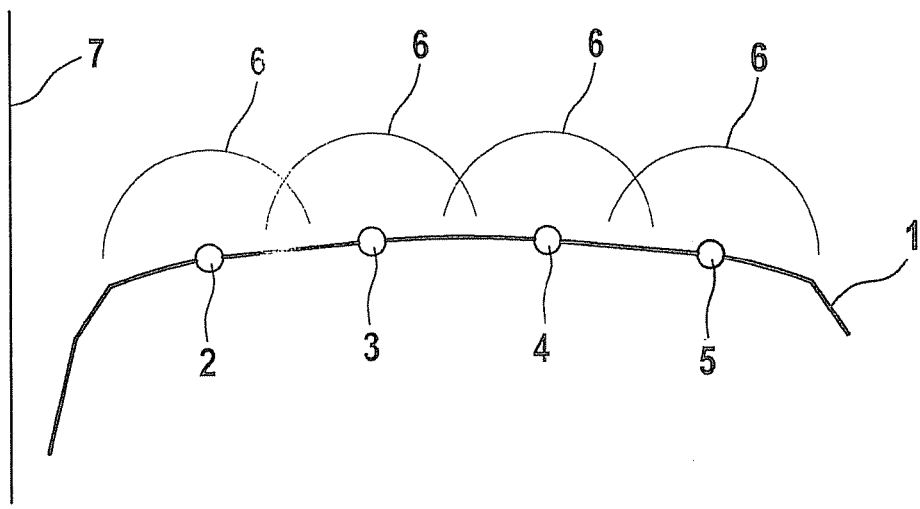
FIG. 1 shows a schematic representation of conventional distance monitoring of a rear region of a vehicle with regard to an object.

FIG. 1 shows a schematic representation of distance monitoring at a vehicle contour 1 in the rear region of a vehicle which is able to carry out a distance measurement between vehicle contour 1 and an obstacle object (not illustrated) spaced apart from vehicle contour 1 using a monitoring device known from the related art. To determine a critical distance between vehicle contour 1 and an obstacle object, sensors 2, 3, 4, 5 may be positioned at the same distance to one another in the vehicle contour. Sensors 2, 3, 4, and 5 are configured to receive measuring signals as direct echo signals or cross echo signals. A cross echo signal is, for example, transmitted by sensor 2 and received by adjoining sensor 3 or vice versa. A direct echo signal is transmitted by a sensor and received by the same sensor.

The minimum limiting value may coincide with the minimum limiting value of the individual sensors. However, the minimum limiting value is usually above the minimum limiting value of the individual sensors in order to not have to operate the system at its technical limits.

Distances below the technical limiting value of sensors 2, 3, 4, 5 cannot be determined, since, in the case of ultrasound sensors as distance measuring devices, for example, the signals blend with the post-pulse oscillation of the diaphragm system of the sensor.

This minimum limiting value 6 may be defined as a full warning limit, i.e., a full warning, e.g., a continuous tone, is signaled to the driver of a vehicle at this point. The distance measurement is based on a propagation time measurement of the signals.

If an obstacle object is detected in the monitored region of sensor 2, an electronic unit generates a visual and/or acoustical warning signal.

In this way, obstacle objects in the monitored region may be signaled to a driver, which are not recognizable by the driver by looking back or by looking into the rearview mirror or the side-view mirror of a vehicle.

The sensors positioned in FIG. 1 monitor the rear region.

The region between an illustrated line of sight 7 and the lateral vehicle contour is not visible to the driver and can also not be detected by sensor 2 as a full warning, since minimum limiting value 6 of sensor 2 is smaller than the distance between sensor 2 and the vehicle corner. If a distance, which is greater than a minimum limiting value 6 of sensor 2, forms when external sensors 2, 5 are positioned in relation to a vehicle corner, no close range warning (full warning signal) is generated by a conventional monitoring device for obstacle objects in the region of a vehicle corner of a vehicle. This results in the risk of possible damage in this region since a full warning signal is not generated until minimum limiting value 6 of sensor 2 is reached.

The distances between external sensors 2, 5 and a vehicle corner of a vehicle are derived from structural and design requirements for the particular vehicle.

Figure 5:
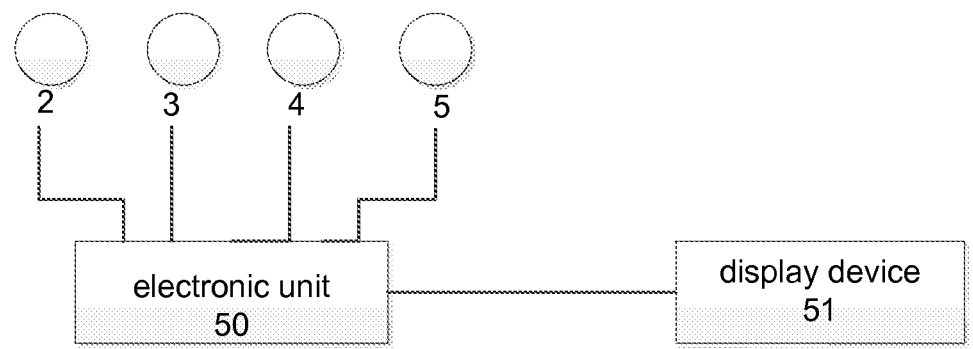
FIG. 5 shows a schematic representation of a device for monitoring a distance between a vehicle and an object, according to the present invention.

FIG. 5 shows a schematic representation of an electronic unit 50 connected to distance sensors 2, 3, 4 and 5, which generates a full warning signal upon reaching a predefined minimum limiting value of a distance ascertained by the distance sensors. FIG. 5 also shows a display device 51 for visually and/or acoustically displaying distances, which is connected to the electronic unit 50.

Figure 2:
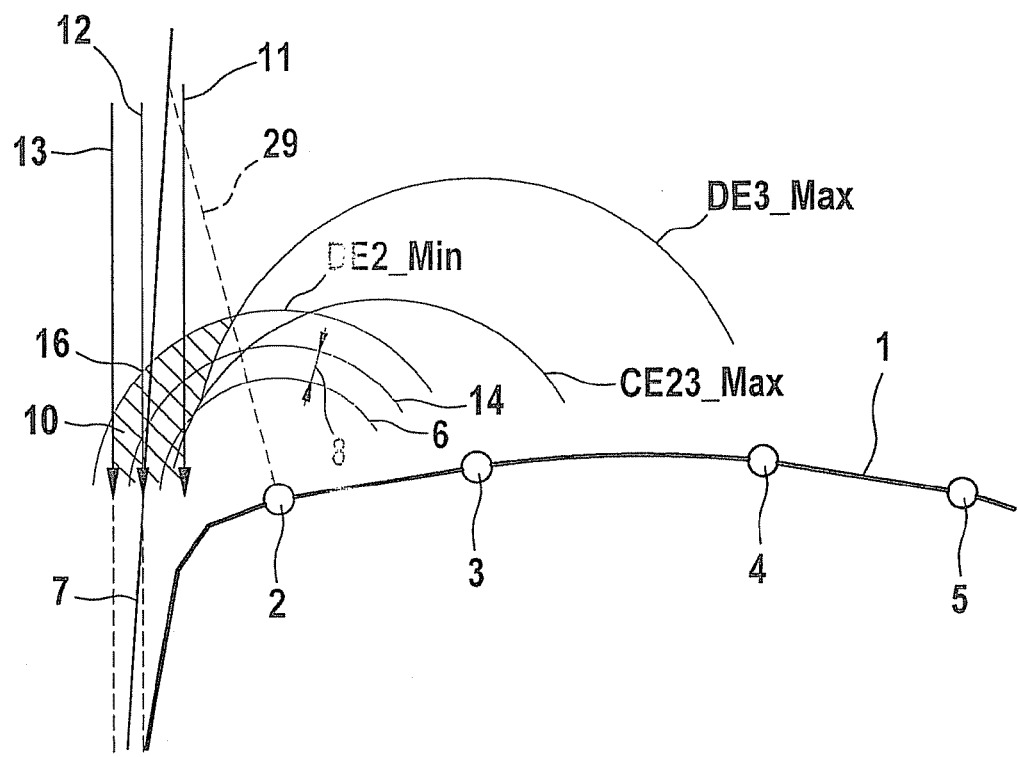
FIG. 2 shows a schematic representation of distance monitoring of a rear region of a vehicle with regard to an object using a single-stage corner coverage.

FIG. 2 shows a schematic representation of distance monitoring at a vehicle contour 1 in the rear region of a vehicle, external sensor 2 being positioned at a distance in relation to the vehicle corner, this distance being smaller than minimum limiting value 6 plus a value, which must be added to a distance value, so that the full warning signal is taken back. This value is referred to as the hysteresis value. A generation of a full warning signal prior to reaching minimum limiting value 6 of sensor 2 is provided to signal to the driver an obstacle object emerging in the corner region of the vehicle before the vehicle is damaged. The emergence of an obstacle object within monitored region 10, illustrated as a shaded area, causes minimum limiting value 6, at which a full warning signal is output, to be increased by an offset value 8. Region 10 may be defined by the limiting values to be established for the ascertained distances between an obstacle object and sensors 2, 3, 4, 5. Additionally, at least one other condition of, for example, a limiting value from a cross echo of sensors 3 and 4 may further define region 10.

The correcting of a minimum limiting value 6 using an offset value 8 takes place in particular when the following conditions are present as "and" combinations:
a distance value of a direct echo of sensor 2 (DE2) is smaller than an established distance (DE2_Min) for a direct echo of sensor 2;
a distance value (CE23) of a cross echo of sensors 2 and 3 is greater than an established distance (CE23_Max) for an established cross echo of sensors 2 and 3;
a distance value (DE3) of a direct echo of sensor 3 is greater than an established distance of a direct echo of sensor 3 (DE3_Max).

Various obstacle courses are described in the following to illustrate the function.

If, for example, an obstacle object approaches on a line 11, the object enters region 10 when the limiting value falls below at DE2_Min, and minimum limiting value 6 of sensor 2 or a distance calculated from the combined echoes is corrected to a new warning distance value 14 using an offset value 8. As soon as the new warning distance value 14 is reached, a full warning signal is output.

If, for example, an obstacle object approaches according to line 12, a full warning would not be generated without the correction of minimum limiting value 6 using an offset value 8, and the obstacle object would cause damage to the vehicle. A warning distance value which lies before a line of sight 7 is not established.

The course of an obstacle object on line 12 subjected to offset correction meets the condition for an offset 8 (see shading of region 10), whereby a full warning is triggered at the point of intersection of line 12 and new warning distance value 14. One possibility for an offset correction may be that offset value 8 is subtracted from the measured distance of sensor 2 at point of intersection 16 of line 12 and the limiting value at DE2_Min. This would correspond to an addition to the minimum warning distance.

If, for example, an obstacle object approaches according to line 13, the object enters monitored region 10 outside line of sight 7 when the limiting value falls below at DE2_Min. Offset value 8 is subtracted from the distance value at limiting value DE2_Min for DE2. However, a full warning signal is not generated, since a collision course with the warning distance does not exist.

Figure 3:
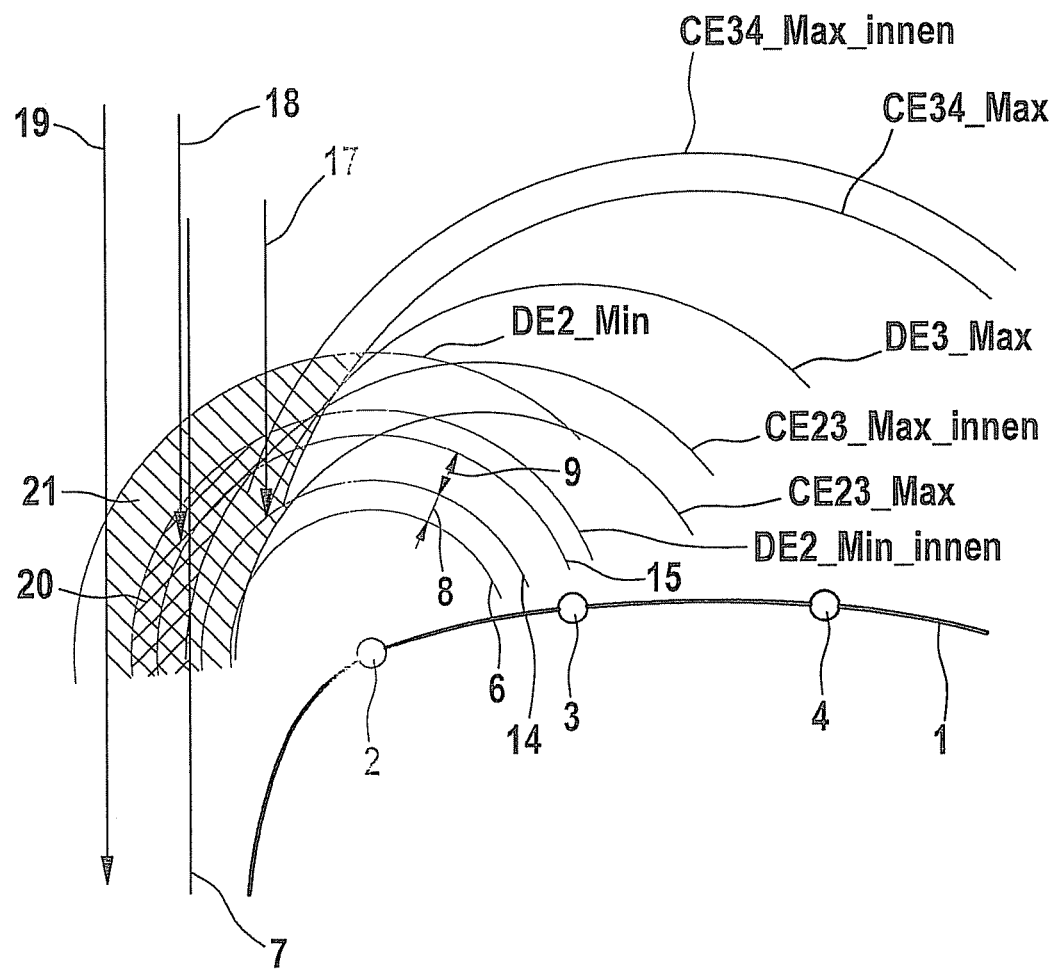
FIG. 3 shows a schematic representation of distance monitoring of a rear region of a vehicle with regard to an object using a two-stage corner coverage.

FIG. 3 is supposed to illustrate the operation type of a device for monitoring a distance of a vehicle, the distance region to be monitored being divided into two different regions: a first region 21 and a second region 20.

A two-stage monitoring of the corner region may be used when the distance between external sensor 2 and the vehicle corner is smaller than minimum limiting value 6 plus a doubled hysteresis value. In a first stage, the consideration of a first offset 8 is provided, and in a second stage, the consideration of an additional offset 9 is provided, in order to signal to the driver an obstacle object emerging in the corner region of the vehicle, before the vehicle is damaged.

First monitored region 21 is established by the following conditions:
direct echo DE2 of the second sensor is smaller than an established limiting value DE2_Min for a distance of a direct echo of sensor 2;
a distance value CE23 of a cross echo of sensors 2 and 3 is greater than an established limiting value CE23;
a distance value DE3 of a direct echo of sensor 3 is greater than a limiting value DE3_Max.

Additionally, a cross echo of sensors 3, 4 may be taken into consideration in such a way that a distance value is greater than a limiting value CE34_Max of the cross echo.

If these conditions coincide, a minimum limiting value is corrected by a first offset value 8 of the first stage. Monitored region 20 may be defined by the conditions below.

A distance value DE2 of a direct echo of sensor 2 is smaller than an established limiting value DE2_Min_Innen, and a distance value CE23 of a cross echo of sensors 2, 3 is greater than an established limiting value CE23_Max_Innen. If the conditions for monitored region 21 and the conditions for second monitored region 20 are met, an additional offset value 9 is considered as to minimum limiting value 6 in addition to offset value 8. Additionally, a cross echo of sensors 3, 4 may be taken into consideration in such a way that a distance value is greater than a limiting value CE34_Max_Innen of the cross echo.

Various obstacle courses are supposed to illustrate in the following the obstacle recognition on the basis of the two defined regions 20 and 21.

If, for example, an obstacle object approaches according to line 17, minimum limiting value 6 of sensor 2 is corrected using first offset value 8 when the limiting value falls below at DE2_Min and the obstacle object emerges in region 21. If, in the further course, a distance to the obstacle object is detected which lies below an established limiting value DE2_Min_Innen for a distance of a direct echo of sensor 2, the distance value or minimum limiting value 6 is corrected for the second time using a second offset value 9. If an obstacle leaves region 20 at limiting value CE23_Max_Innen this correction is revoked. Only first offset value 8 is then relevant. A full warning does not take place until warning distance value 14 for the first stage is reached.

If, for example, an obstacle object approaches according to line 18 in the region of line of sight 7, minimum limiting value 6 is corrected using an offset value 8 when the limiting value falls below at DE2_Min. In the further course, the distance value is corrected again using second offset value 9 when the limiting value falls below at DE2_Min_Innen, and a full warning is generated when the obstacle reaches a corrected warning distance 15. Warning distance value 15 then lies within monitored region 20.

If, for example, an obstacle object approaches according to line 19, the object enters monitored region 21 outside line of sight 7 when the limiting value falls below at DE2_Min. Offset value 8 is subtracted from the distance value at the limiting value for DE2. A full warning signal is not generated, since a collision course with warning distance 14 does not exist.

Figure 4:
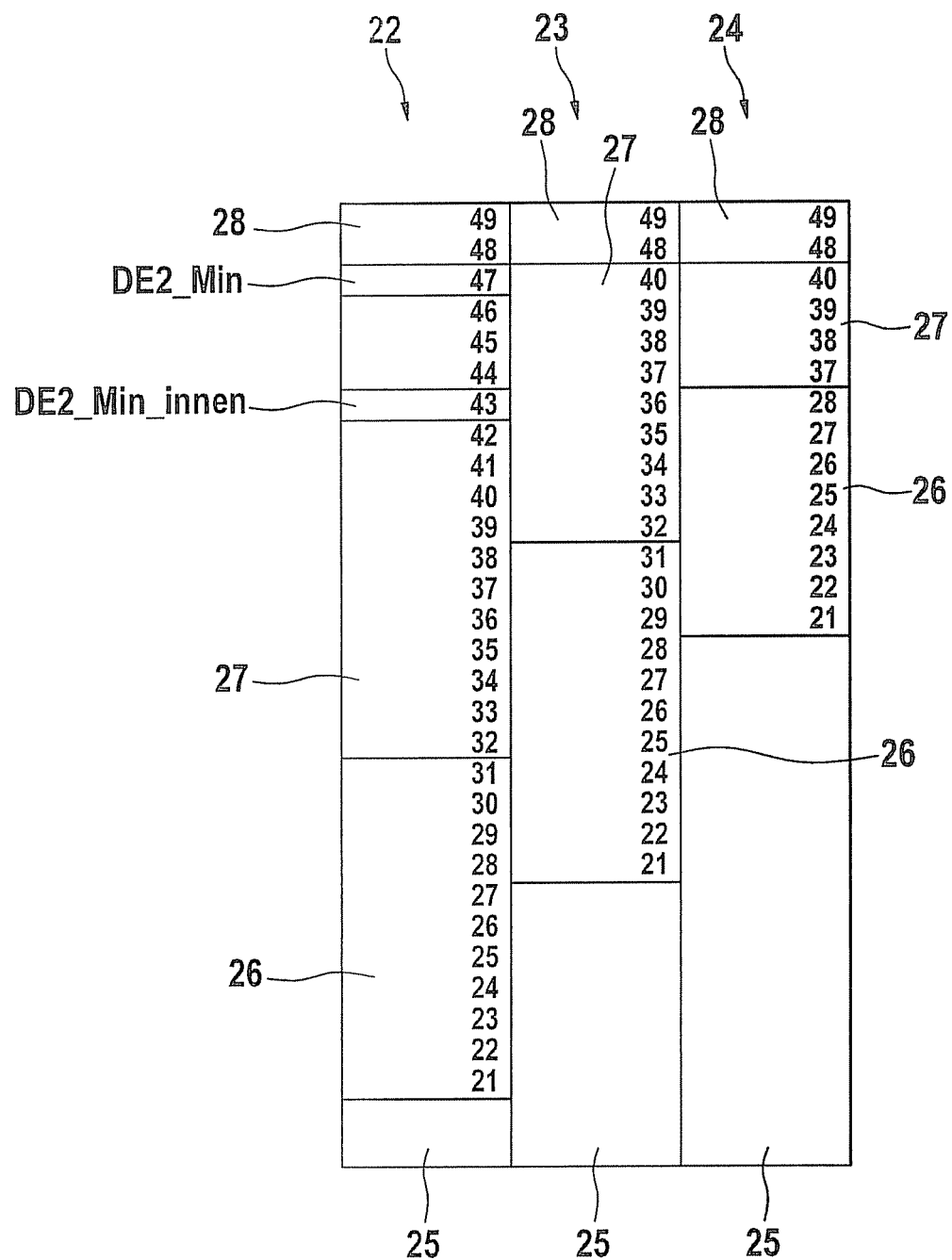
FIG. 4 shows a schematic representation regarding the evaluation of measured distance values with and without offset corrections of the distance values.

FIG. 4 shows a schematic representation for illustrating the consideration of the offset values with reference to sensor 2. Distance values DE2 are thus illustrated. The distances of an obstacle object are displayed in different stages for the driver, which may be via light-emitting diodes in different colors or acoustically using different tone pulse sequences.

If a condition for correcting a distance value is met, the display is offset similarly to a coordinate transformation, for example.

First column 22 of FIG. 4 shows a visual signaling of distance values, range 25 signaling a full warning, range 26 an advance warning, range 27 a piece of information 1, and range 28 a piece of information 2.

In second column 23, ranges 25, 26, 27, 28 are shown offset by first offset value 8. This is an illustration of the single-stage case.

In third column 24, ranges 25, 26, 27, 28 are shown offset additionally by second offset value 9 as compared to second column 23. This is an illustration of the two-stage case.

The offset will be explained based on a subsequent example:

If, for example, the measured distance value of a direct echo of sensor 2 DE2 is smaller than or equal to established limiting value DE2_Min at a distance DE2_Min=47 of a direct echo of sensor 2, the distance value is corrected by first offset value 8. In second column 23, the display is offset from value 47 to value 40. The value for offset 8 is thus 7. If measured distance value DE2 is also smaller or equal to the value at DE2_Min_Innen=43, the distance value is corrected for the second time using second offset value 9, and the display is offset in third column 24 from value 36 to value 28. The additional value for offset 9 is thus 8. The offset values thus add up to a total of 15. In the single-stage and the two-stage cases, it was assumed that all the other, in particular above-described, conditions are met, and an evaluation only depends on direct echo DE2.

According to the illustrated cases, an output or a display for the driver may be updated when an obstacle approaches the vehicle. If an obstacle moves away, it may be established that it must first move away by a value X before the display is updated, i.e., returns back to the previously valid warning state. This value X may, for example, account for ten units, e.g., 10 cm, with reference to FIG. 4.

With respect to the limiting value dimensions, the following conditions may be indicated, for example:

A first offset 8 may be smaller than a display hysteresis value X. Limiting value DE2_Min may be greater or equal to minimum distance value 6 plus offset value 8. In the second stage, offset value 9 may be smaller than the sum of first offset value 8 and display hysteresis value X.

Second offset value 9 may be smaller than limiting value DE2_Min_Innen, the latter, in turn, being smaller than limiting value DE2_Min.

The present invention should not be limited to the specific embodiments for monitoring one single vehicle corner. Rather, all vehicle corners of a vehicle may be monitored using the device according to the present invention, the single-stage and the two-stage corner monitoring described in the exemplary embodiment being expandable by additional stages.

What is claimed is:

1. A device for monitoring a distance between a vehicle and an object, comprising:
    distance sensors mountable in a front region and/or a rear region of the vehicle, a first distance sensor being positioned in a region of a vehicle corner and a second distance sensor being positioned spaced apart from the first sensor in a direction of the center of the vehicle for monitoring a distance region surrounding the vehicle corner;
    an electronic unit connected to the distance sensors, which generates a full warning signal upon reaching a predefined minimum limiting value of a distance ascertained by the distance sensors; and
    a display device for visually and/or acoustically displaying distances;
    wherein the electronic unit is configured to generate a full warning signal even prior to reaching the predefined minimum limiting value for an ascertained distance at an established first warning distance value which is greater than the minimum limiting value of a sensor, if a first distance ascertained by a direct echo of the first sensor is smaller than a first limiting value, the first limiting value being greater than the minimum limiting value of the first sensor, and if a second distance ascertained by a direct echo of the second sensor is greater than a second limiting value, the second limiting value being greater than a minimum limiting value of the second sensor, wherein the first limiting value defines a first limiting distance from the first sensor, a first area being defined within the first limiting distance from the first sensor, wherein the second limiting value defines a second limiting distance from the second sensor, a second area being defined outside the second limiting distance from the second sensor, and wherein a first region of the first area is overlapping the second area and a second region of the first area is not overlapping the second area, the full warning signal being generated if the object is detected within the first region, the full warning signal not being generated if the object is detected within the second region.

2. The device of claim 1, wherein the first limiting value and the second limiting value are selected so that in a region of a central measuring axis before the first sensor both the first limiting value and the second limiting value have the same value at least at one point.

3. The device of claim 1, wherein the electronic unit is configured to generate a full warning signal even prior to reaching the predefined minimum limiting value for an ascertained distance at an established warning distance value, if a distance, which is smaller than a first limiting value, is ascertained by a direct echo of the first sensor, the first limiting value being greater than the minimum limiting value, and if a distance, which is greater than a third limiting value, is ascertained by a cross echo of the first sensor and the second sensor.

4. The device of claim 3, wherein the first limiting value and the third limiting value are selected so that between a range before the minimum limiting value of the first sensor and the second limiting value, both the first limiting value and the third limiting value have an identical value at least at one point.

5. The device of claim 1, wherein the electronic unit is configured to output a full warning signal even prior to reaching the predefined minimum limiting value for an ascertained distance only at a second warning distance value, which is greater than the first warning distance value by an offset, if a distance, which is smaller than a fourth limiting value, is additionally ascertained by a direct echo of the first sensor, and a distance, which is greater than a fifth limiting value, is ascertained by a cross echo of the first sensor and the second sensor, the fourth limiting value being smaller than the first limiting value, and the fifth limiting value being greater than the minimum limiting value of the first sensor.

6. The device of claim 5, wherein the fourth limiting value and the fifth limiting value are selected so that in a range between the first limiting value and the third limiting value before the first sensor, both the fourth limiting value and the fifth limiting value have an identical value at one point.

7. The device of claim 1, wherein the first offset value is set to a value when the predefined value is smaller than a hysteresis value for taking back a generated full warning signal.

8. The device of claim 1, wherein the second offset value is set to a value which is smaller than the first offset value plus a hysteresis value.

9. The device of claim 1, wherein the first limiting value is greater than the minimum limiting value plus the first offset value.

10. The device of claim 1, wherein the second offset value is smaller than the fourth limiting value which is smaller than the first limiting value.

\* \* \* \* \*